United States Patent
Hu et al.

(10) Patent No.: US 12,523,752 B2
(45) Date of Patent: Jan. 13, 2026

(54) ONLINE SENSOR ALIGNMENT USING FEATURE REGISTRATION

(71) Applicant: GM GLOBAL TECHNOLOGY OPERATIONS LLC, Detroit, MI (US)

(72) Inventors: Yao Hu, Sterling Heights, MI (US); Xinyu Du, Oakland Township, MI (US); Binbin Li, Columbus, OH (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 749 days.

(21) Appl. No.: 17/974,985

(22) Filed: Oct. 27, 2022

(65) Prior Publication Data

US 2024/0142590 A1     May 2, 2024

(51) Int. Cl.
*G01S 7/497*  (2006.01)
*G01S 7/40*   (2006.01)

(52) U.S. Cl.
CPC .............. *G01S 7/4972* (2013.01); *G01S 7/40* (2013.01)

(58) Field of Classification Search
CPC . G01S 7/4972; G01S 7/40; G06T 7/80; G06T 7/33
See application file for complete search history.

(56) References Cited

U.S. PATENT DOCUMENTS

| | | | | |
|---|---|---|---|---|
| 2013/0242284 | A1* | 9/2013 | Zeng | G01S 17/931 |
| | | | | 356/4.01 |
| 2020/0005489 | A1* | 1/2020 | Kroeger | G06T 7/85 |
| 2020/0174197 | A1* | 6/2020 | Lin | G03B 17/04 |
| 2022/0194412 | A1* | 6/2022 | Zhang | B60W 60/001 |

* cited by examiner

*Primary Examiner* — Kenneth J Malkowski
(74) *Attorney, Agent, or Firm* — CANTOR COLBURN LLP

(57) ABSTRACT

A computer-implemented method for aligning a sensor to a vehicle includes receiving a first frame of measurement from the sensor which includes a first point cloud. One or more clusters $C_i$ representing one or more objects or the ground are segmented. A first set of feature vectors $f_i$ is computed for each cluster $C_i$. Based on the first set of feature vectors $f_i$ a second set of feature vectors $f_i'$ is predicted respectively using an initial transformation. A third set of feature vectors $f_j$ is computed for a second frame with a second point cloud with clusters $C_j$. A pair of matching clusters is identified from $C_i$ and $C_j$. A feature distance between the matching clusters is computed. An alignment transformation is computed by updating the initial transformation based on the feature distance. The method further includes aligning the sensor and the vehicle based on the alignment transformation.

20 Claims, 4 Drawing Sheets

ONLINE SENSOR ALIGNMENT USING FEATURE REGISTRATION

INTRODUCTION

The subject disclosure relates to automotive computing technology, particularly to calibrating sensors on a vehicle.

Vehicles (e.g., automobiles, trucks, construction equipment, farm equipment, etc.) may include one or more sensors, such as cameras, proximity sensors, motion sensors, RADARs, LIDARs, etc. The information from the sensors facilitates semi-autonomous or autonomous operation of the vehicle. The sensors can further facilitate providing back-up assistance, take images of the vehicle driver to determine driver drowsiness or attentiveness, images of the road as the vehicle is traveling for collision avoidance purposes, structure recognition, such as roadway signs, etc. It is critical to accurately calibrate the position and orientation of the sensors with respect to the vehicle. Because of manufacturing tolerances, a separate end-of-line sensor calibration, or aftermarket adjustment, is performed on each vehicle.

Some known sensor systems do not provide for calibration. Other sensor systems provide a pre-calibration approach where measurements are manually calibrated into the vehicle coordinates, such as by providing a checkerboard pattern of an image. However, these calibration techniques are typically time consuming and must be performed at a service location. Therefore, if the vehicle is traveling and the sensor position is altered, for example, because of a bump, an obstacle in the road, weather, or any other reason, the calibration will not be accurate until the vehicle is taken to the service location to be corrected.

Sensor calibration involves determining a set of parameters that relate coordinates associated with the sensor measurements to vehicle coordinates and vice versa. Some sensor parameters, such as focal length, optical center, refresh rate, etc., are stable (i.e., do not depend on the vehicle), while other parameters, such as orientation and position, are not. For example, the height of the sensors can depend on the load of the vehicle, which will change from time to time. This change can cause sensor measurements and results based on the sensor measurements to be inaccurate. Therefore, what is needed is a sensor calibration process that automatically calibrates less stable sensor parameters as the vehicle is being driven where the vehicle-sensors continually adapt themselves over time.

SUMMARY

According to one or more embodiments, a computer-implemented method for aligning a sensor to a vehicle. The computer-implemented method includes receiving a first frame of measurement from a sensor associated with a vehicle, the first frame comprising a first point cloud representing one or more objects or the ground. The method further includes segmenting, from the first frame, one or more clusters $C_i$ representing the one or more objects or the ground, respectively. The method further includes computing a first set of feature vectors $f_i$, for each of the one or more clusters $C_i$, respectively. The method further includes predicting, based on the first set of feature vectors $f_i$, a second set of feature vectors $f_i'$ respectively based on an initial transformation. The method further includes computing a third set of feature vectors $f_j$ for a second frame comprising a second point cloud comprising one or more clusters $C_j$ representing the one or more objects or the ground. The method further includes identifying a pair of matching clusters from the clusters $C_i$ and $C_j$ from the first frame and the second frame, respectively. The method further includes computing a feature distance between the matching clusters. The method further includes computing an alignment transformation by updating the initial transformation based on the feature distance. The method further includes aligning the sensor and the vehicle based on the alignment transformation.

In one or more embodiments, predicting the second set of feature vectors includes. computing a vehicle motion vector B based on a velocity of the vehicle, and computing a sensor motion vector A based on the vehicle motion vector B.

In one or more embodiments, predicting the second set of feature vectors further comprises, predicting a feature vector $f_i'$ of the cluster $C_i'$ based on the sensor motion vector A and a feature vector $f_i$ of the cluster $C_i$.

In one or more embodiments, the sensor motion vector A is computed as $A = X\_init \, B \, X\_init^T$, $X\_init$ being the initial transformation.

In one or more embodiments, a feature vector $f_n$ of a cluster $C_n$ includes at least one of the cluster center positions, cluster orientations, cluster sizes, cluster shapes, and number of points in the cluster.

In one or more embodiments, the sensor is one of a camera, a LIDAR, and a RADAR.

In one or more embodiments, the alignment transformation comprises one of a transformation matrix, a quaternion, and a set of parameters comprising roll, pitch, yaw, x-translation, y-translation, and z-translation.

In one or more embodiments, the sensor is mounted on the vehicle, and the alignment transformation aligns a first coordinate system of the sensor to a second reference coordinate system of the vehicle.

In one or more embodiments, the sensor is mounted on the vehicle, and the alignment transformation aligns a first coordinate system of the sensor to a second reference coordinate system of another sensor of the vehicle.

According to one or more embodiments, a system for dynamically aligning a sensor to a vehicle includes a processor comprising a plurality of processing cores. The system further includes a memory device coupled with the processor, wherein the processor is configured to align the sensor and the reference coordinate system by performing a method. The method includes receiving a first frame of measurement from a sensor associated with a vehicle, the first frame comprising a first point cloud representing the one or more objects or the ground. The method further includes segmenting, from the first frame, one or more clusters $C_i$ representing the one or more objects or the ground, respectively. The method further includes computing a first set of feature vectors $f_i$, for each of the one or more clusters $C_i$, respectively. The method further includes predicting, based on the first set of feature vectors $f_i$, a second set of feature vectors $f_i'$ respectively based on an initial transformation. The method further includes computing a third set of feature vectors $f_j$ for a second frame comprising a second point cloud comprising one or more clusters $C_j$ representing the one or more objects or the ground. The method further includes identifying a pair of matching clusters from the clusters $C_i$ and $C_j$ from the first frame and the second frame, respectively. The method further includes computing a feature distance between the matching clusters. The method further includes computing an alignment transformation by updating the initial transformation based on the feature distance. The method further includes aligning the sensor and the vehicle based on the alignment transformation.

In one or more embodiments, predicting the second set of feature vectors includes computing a vehicle motion vector B based on a velocity of the vehicle, and computing a sensor motion vector A based on the vehicle motion vector B.

In one or more embodiments, predicting the second set of feature vectors further comprises, predicting a feature vector $f_i'$ of the cluster $C_i'$ based on the sensor motion vector A and a feature vector $f_i$ of the cluster $C_i$.

In one or more embodiments, the sensor motion vector A is computed as $A = X\_init\ BX\_init^T$, $X\_init$ being the initial transformation.

In one or more embodiments, a feature vector $f_n$ of a cluster $C_n$ includes at least one of the cluster center positions, cluster orientations, cluster sizes, cluster shapes, and the number of points of the cluster.

In one or more embodiments, the sensor is mounted on the vehicle, and the alignment transformation aligns a first coordinate system of the sensor to a second reference coordinate system of the vehicle or of another sensor of the vehicle.

According to one or more embodiments, a vehicle includes a sensor, a processor including multiple processing cores, and a memory device coupled with the processor. The processor is configured to align the sensor to the vehicle by performing a method. The method includes receiving a first frame of measurement from a sensor associated with a vehicle, the first frame comprising a first point cloud representing the one or more objects or the ground. The method further includes segmenting, from the first frame, one or more clusters $C_i$ representing the one or more objects or the ground, respectively. The method further includes computing a first set of feature vectors $f_i$, for each of the one or more clusters $C_i$, respectively. The method further includes predicting, based on the first set of feature vectors $f_i$, a second set of feature vectors $f_i'$ respectively based on an initial transformation. The method further includes computing a third set of feature vectors $f_j$ for a second frame comprising a second point cloud comprising one or more clusters $C_j$ representing the one or more objects or the ground. The method further includes identifying a pair of matching clusters from the clusters $C_i$ and $C_j$ from the first frame and the second frame, respectively. The method further includes computing a feature distance between the matching clusters. The method further includes computing an alignment transformation by updating the initial transformation based on the feature distance. The method further includes aligning the sensor and the vehicle based on the alignment transformation.

In one or more embodiments, predicting the second set of feature vectors includes computing a vehicle motion vector B based on a velocity of the vehicle, and computing a sensor motion vector A based on the vehicle motion vector B. The sensor motion vector A is computed as $A = X\_init\ BX\_init^T$, $X\_init$ being the initial transformation.

In one or more embodiments, predicting the second set of feature vectors further comprises, predicting a feature vector $f_i'$ of the cluster $C_i'$ based on the sensor motion vector A and a feature vector $f_i$ of the cluster $C_i$.

In one or more embodiments, a feature vector $f_n$ of a cluster $C_n$ includes at least one of the cluster center positions, cluster orientations, cluster sizes, cluster shapes, and the number of points in the cluster.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
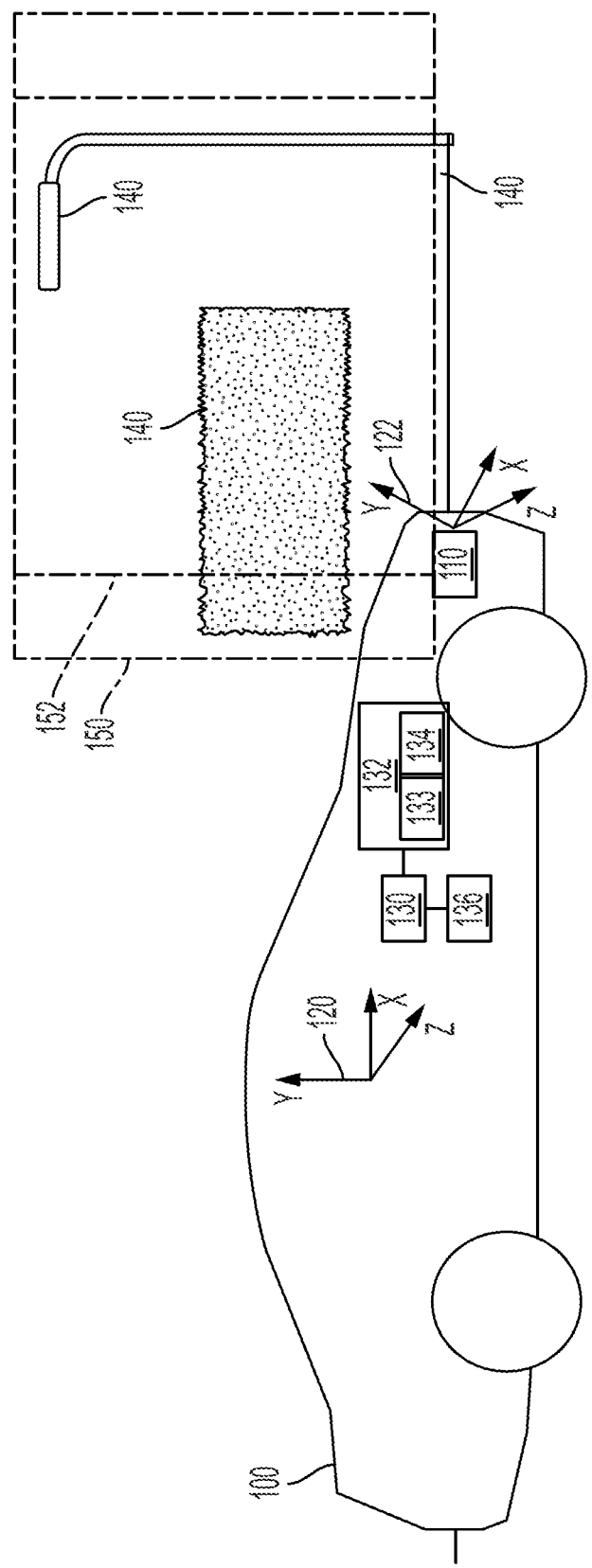
FIG. 1 is a block diagram of a vehicle that implements on-board alignment of a sensor according to one or more aspects.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, a system and method are disclosed for calibrating, and particularly aligning one or more sensors on a vehicle dynamically, using an on-board computing system of the vehicle. In one or more embodiments, the calibration is performed as the vehicle is being driven.

Technical challenges with using sensors onboard a vehicle include aligning the sensors to a known, and common frame of reference. Perception and localization are subject to sensor alignment. Performing an online alignment of sensors, such as cameras, and LIDAR is constrained in that pre-defined targets are not available online (i.e., during use of the vehicle; when the vehicle is with a user/operator/consumer, rather than a servicing/manufacturing facility where pre-defined targets are available). Existing techniques, such as hand-eye and aggregation-based methods, use external information sources, such as an inertial motion unit (IMU) and/or global positioning system (GPS) to assist with the alignment of a sensor. However, errors of IMU/GPS sensors impact the alignment accuracy. Some existing techniques use lane markings, or other such markings to help with the alignment. However, such markings are not always available as targets for alignment due to weather, road condition, etc.

Technical solutions described herein use a feature extraction technique to dynamically align a sensor and address such technical challenges. Aspects of the technical solutions described herein use registration of features extracted from the sensor measurements and relies on static objects (e.g., traffic signs, light poles, trees, hedges, etc.) and does not require aggregation using IMU/GPS. Further, aspects of the technical solutions herein provide a system architecture of online alignment based on feature registration. One or more aspects of the technical solutions herein facilitate a feature descriptor and extraction method for static objects. Further yet, aspects of the technical solutions herein facilitate a registration method covering position, shape, orientation, etc.

While several examples herein are described using a camera or a LIDAR as example sensors, it is understood that the technical solutions described herein are not limited thereto, and can be applied to any other types of sensor, such as RADARS, proximity sensors, or any other sensors that generate a point cloud. A point cloud is a set of points in 3D space in which each point is defined by a 3D coordinate. Sensors such as LIDARs can collect points measurements from the surface of objects in the environment, such that the positions of the points in the point cloud infer the positions of objects. Further, while the examples herein are described in the context of an automobile, the technical solutions herein can be applicable in other situations where computational resources are similarly limited.

In accordance with an exemplary embodiment, FIG. 1 is a block diagram of a vehicle 100 that implements on-board alignment of a sensor 110 according to one or more aspects. The exemplary vehicle 100 shown in is an automobile, however, technical solutions described herein are not limited thereto, and can be applicable to boats, construction equipment, farming equipment, trucks, or any other type of vehicle. The sensor 110 can be any type of sensor, such as RADAR, LIDAR, camera, or any other sensor. Although only a single block is shown to depict sensor 110, in some aspects, the sensor 110 can include multiple sensors of the same or of different type. The numbers and locations of the sensor 110 are not intended to be limited by the exemplary illustration herein.

The vehicle 100 further includes a controller 130. The controller 130 may obtain information from the sensor 110, analyze the information, and control semi-autonomous or autonomous operation of the vehicle 100. Alternatively, or in addition, the controller 130 may provide one or more outputs based on the analysis of the information, for example, via a display, speakers, or any other such output devices (not shown). The controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The controller 130 includes one or more processing units/cores that facilitate parallel computing using multiple threads. The controller 130 may include an arithmetic logic unit, a microprocessor, a general purpose controller or some other processor array to perform computations and provide electronic display signals to a display device. The controller 130 processes data signals and may support computing architectures including a complex instruction set computer ("CISC"), a reduced instruction set computer ("RISC") or a combination thereof. Although a single controller 130 is depicted, the vehicle 100 may include multiple controllers in one or more aspects.

The controller 130 is coupled with (or includes) a memory 132. The memory 132 may be a non-transitory computer readable memory. The memory 132 stores instructions or data that can be executed by the controller 130. The instructions or data contain computer source code for performing the technical solutions described herein. The memory 132 can include volatile memory (VM) 133, such as a dynamic random access memory (DRAM) device, a static random access memory (SRAM) device, flash memory, or any other memory device. In addition, or alternatively, the memory 132 includes a non-volatile memory (NVM) 134, such as a hard disk drive, a floppy disk drive, a CD-ROM device, a DVD-ROM device, a DVD-RAM device, a DVD-RW device, a flash memory device, or some other mass storage device for storing information on a more permanent basis.

The controller 130 and the memory 132 may be part of an electronic control unit (ECU). In some aspects, the controller 130 may be connected to one or more elements of the vehicle via a bus.

The vehicle 100 has a vehicle coordinate system 120, depicted by (X, Y, Z) and the sensor 110 has a separate coordinate system 122, depicted by (x, y, z). As noted herein, a technical challenge with using the sensor 110 is to align the two coordinate systems 120, 122 so that the actions taken by the controller 130 based on the analysis of the information from the sensor 110 is accurate for the vehicle 100. Such an alignment is part of calibrating the sensor 110.

In addition, alternatively, the alignment may be performed between two or more sensors alignment (e.g. camera to LIDAR), sensor to Ground alignment (e.g. camera to ground), or any other component alignments. For example, the technical solutions described herein facilitate aligning one or more components to a common frame of reference (e.g., the vehicle coordinate system 120). Once alignment to the common frame of reference is established, measurements from one component can be transformed into coordinate system of any other component that is also mapped to the common frame of reference.

The sensor 110 can capture a first point cloud of a first frame 150 that is presently in the field of view of the sensor 110 at time t0. At time t1 (>t0), the sensor 110 captures a second point cloud of a second frame 152 that is in the field of view at that time. The sensor 110 can capture a frame at a predetermined frequency, for example, 30 frames per second, 60 frames per second, etc. Each frame (150, 152) captured facilitates detection and identification of objects 140 in the field of view of the sensor 110, and consequently in the field of view of the vehicle 100. Exemplary objects 140 in the field of view of the sensor 110 are shown, such as a road surface, a hedge row, a lamp post. It is understood that several other types of objects can be measured, detected, identified, represented digitally, and/or processed in one way or the other by the sensor 110. For example, other types of objects can include but are not limited to trees, vehicles, pedestrians, buildings/structures, walls, barriers, cones, fences, traffic lights, etc.

It should be noted that the vehicle 100 may include an autonomous vehicle, a semi-autonomous vehicle, or Highly Automated Vehicle ("HAV"). For example, the controller 130 may operate as an advanced driver-assistance system (ADAS), which is operable to make the vehicle 100 an autonomous vehicle.

In one or more aspects, the vehicle 100 further includes a system control and diagnostics module 136. The system control and diagnostics module 136 verifies the status of the sensor 110, including that the sensor 110 is aligned with the vehicle 100. The verification may be performed at periodic intervals, in response to particular events (e.g., bumps of at least a certain threshold, servicing, opening/closing of one or more enclosures of the vehicle, such as the hood, vehicle being turned on/off, or any other such events). In one or more aspects, the occurrence of one or more events may be based on a sensor and/or based on a code (e.g., on-board diagnostic (OBD) code). In some aspects, the system control and diagnostics module 136 may initiate an alignment of the sensor 110 at a predetermined periodic interval (e.g., every 24 hours, every 6 hours, etc.). Alternatively, or in addition, the system control and diagnostics module 136 may initiate the alignment in response to the particular events. The system control and diagnostics module 136 initiates the alignment by sending a command/instruction to the controller 130.

Figure 2:
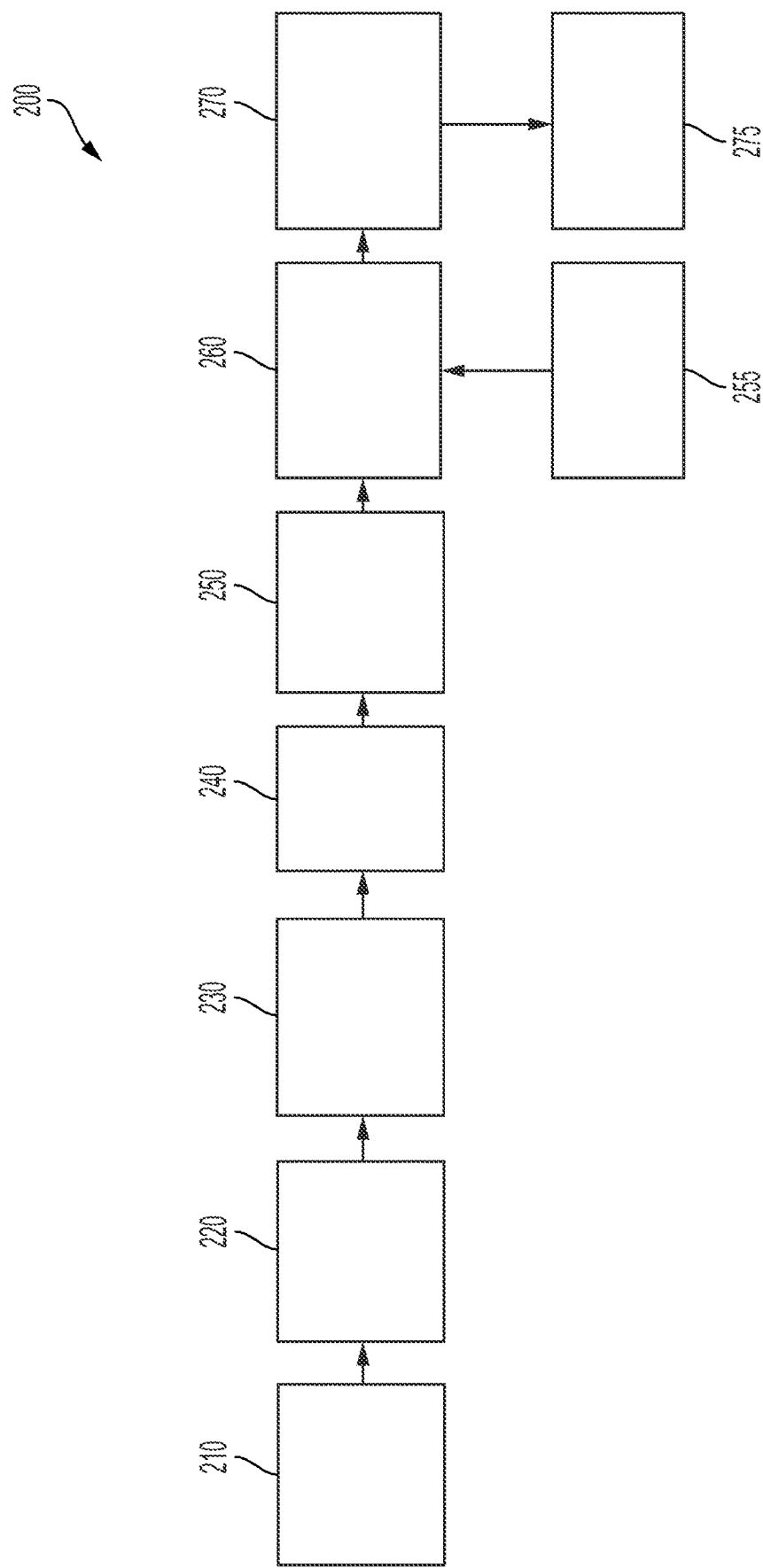
FIG. 2 depicts a flowchart of a method of alignment of a sensor, such as a LIDAR, and a reference coordinate system according to one or more embodiments.

FIG. 2 depicts a flowchart of a method of alignment of a sensor, such as a LIDAR, and a reference coordinate system according to one or more embodiments. As noted herein, the examples described use the vehicle's coordinate system 120 as the reference coordinate system, however, in other examples, the reference coordinate system can be that of another sensor. The method 200 is shown to start after capturing sensor information along with any peripheral information. The sensor information can include point clouds in the case where the sensor 110 is a LIDAR, depth-enabled camera, etc. The peripheral information can include parameters, such as vehicle speed, vehicle heading, vehicle acceleration, etc.

At block 210, the capture data is pre-processed. For example, data pre-processing can include noise filtering, removing outliers, smoothing, data formatting, feature construction, signal data synchronization, etc. One or more known techniques can be used for the data pre-processing.

Figure 3:
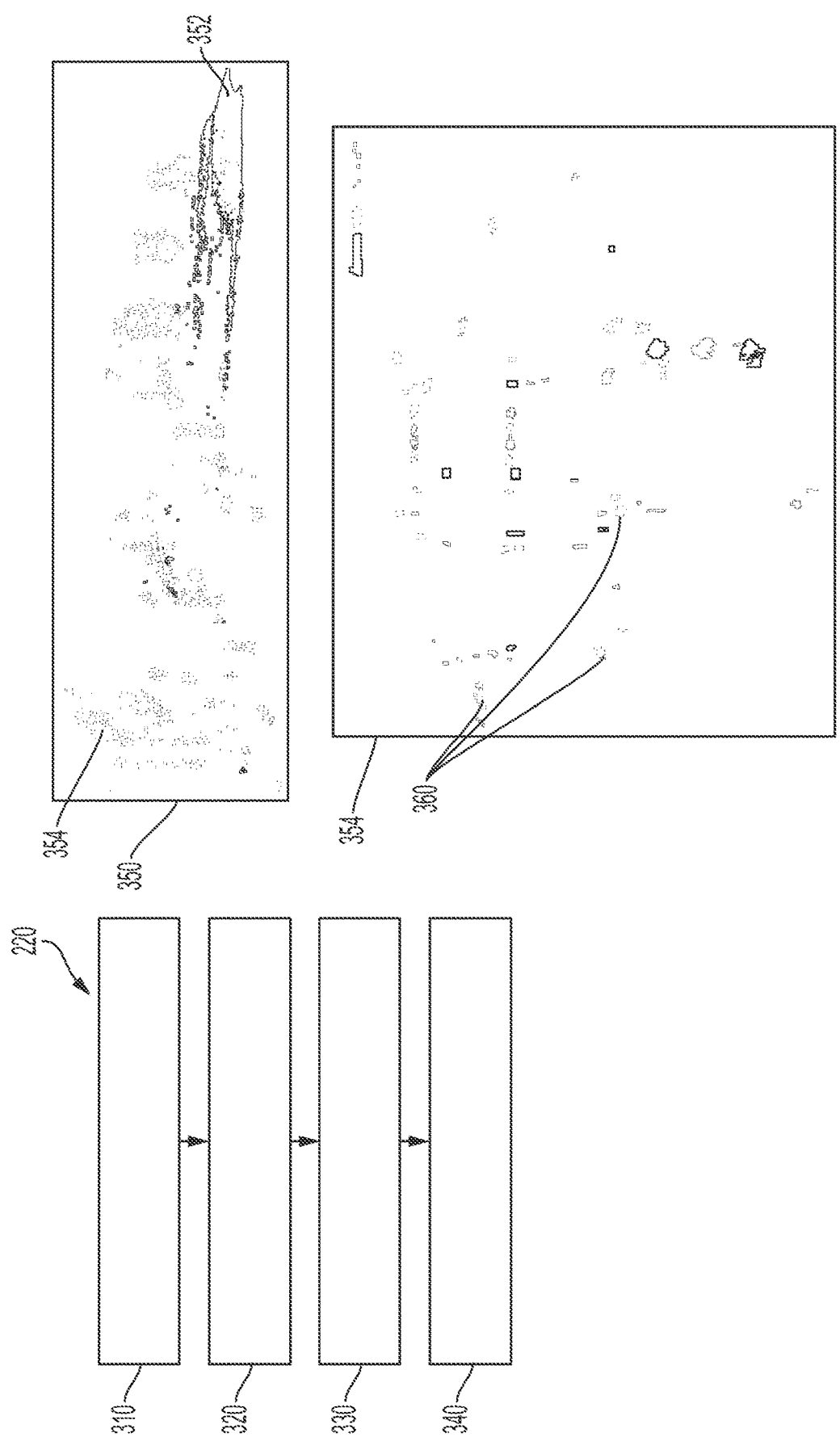
FIG. 3 depicts a flowchart of the operations performed for the ground and objects segmentation according to one or more aspects.

At block 220, ground and objects segmentation is performed using the pre-processed data. FIG. 3 depicts a flowchart of the operations performed for the ground and objects segmentation according to one or more aspects.

At block 310, the points in a point cloud 350 are analyzed and categorized as either ground points G 352 or non-ground points H 354. The non-ground points H 354 can be part of the lamppost, tree, traffic light, hedge, or any other object except the ground. The categorization can be performed using one or more known techniques, such as image processing, machine learning, etc.

At block 320, for the ground points G 352, a center $c_g$ and a normal vector $n_g$ are determined. In one or more aspects principal cluster analysis (PCA) is performed to determine the center and normal vector.

At block 330, from the non-ground points (also referred as object points) H 354, object candidate points $p_i$ are identified. Object candidate points are identified based on the center and normal vector of the ground points G 352. In one or more aspects, a point $p_i$ from H 354 is identified as an object candidate point if $(p_i-c_g) \cdot n_g > \theta_1$, $\theta_1$ being a predetermined threshold value.

At block 340, the object candidate points are used to form a set of clusters $\{C_n\}$ 360. For example, using all object candidate points $\{p_i\}$ as an input value, a clustering algorithm, such as DBSCAN is executed on the (x, y) coordinate space of the sensor 110. The clustering algorithm provides a cluster $C_i$ 360 which is a group of object points $p_i$ for each object.

Accordingly, after performing ground and objects segmentation (220) in this manner (FIG. 3), the ground points G 352 and several clusters 360 representing the one or more objects in the point cloud 350 are segmented.

Referring to method 200 from FIG. 2, at block 230, feature descriptors are generated for the ground points G 352 and each cluster $C_i$ 360. In one or more aspects, for the ground points in G 352, the feature vector is determined as:

$$f_g^T = [c_g^T, n_g^T]$$

Here, $A^T$ denotes a transpose vector/matrix of A.

For points in each cluster $C_i$ 360, PCA is performed to compute:

$$C_i - c_i = U \begin{bmatrix} s_1 & 0 & 0 \\ 0 & s_2 & 0 \\ 0 & 0 & s_3 \end{bmatrix} \begin{bmatrix} v_1^T \\ v_2^T \\ v_3^T \end{bmatrix}$$

Here, $c_i$ is the center of cluster $C_i$ 360. Subsequently, the feature vector for the cluster $C_i$ 360 is computed as:

$$f_n^T = \left[ c_i^T, \frac{s_1}{\sqrt{m}}, \frac{s_2}{\sqrt{m}}, \frac{s_3}{\sqrt{m}}, v_1^T, v_3^T, m \right]$$

Here, m is the number of points in $C_i$. In this equation of principal component analysis (PCA), s are the singular values of matrix $C_i-c_i$, v are the eigenvectors of $C_i-c_i$, U is a left unitary matrix. The feature vectors thus computed are used as the feature descriptors for the ground points G 352 and the respective cluster $C_i$ 360.

At block 240, a feature prediction corresponding to a future frame (152) and feature matching is performed. The future frame 152 has yet to be captured and will be captured at time t1. The prediction is being performed before t1. To predict the future frame 152, a vehicle motion B is first computed.

In one or more aspects, the vehicle motion B is determined using vehicle speed vel and time interval between two frames τ. B is computed as:

$$B = \begin{bmatrix} I & -vel\tau \\ 0 & 1 \end{bmatrix}.$$

In other aspects, the vehicle motion B is determined using a GPS/IMU associated with the vehicle 100. The motion B is determined using known techniques from the readings/output from the GPS/IMU.

Further, sensor motion A is computed based on B and an initial guess of alignment $X_{init}$ between vehicle-to-sensor as:

$$A = X_{init} B X_{init}^T.$$

Figure 4:
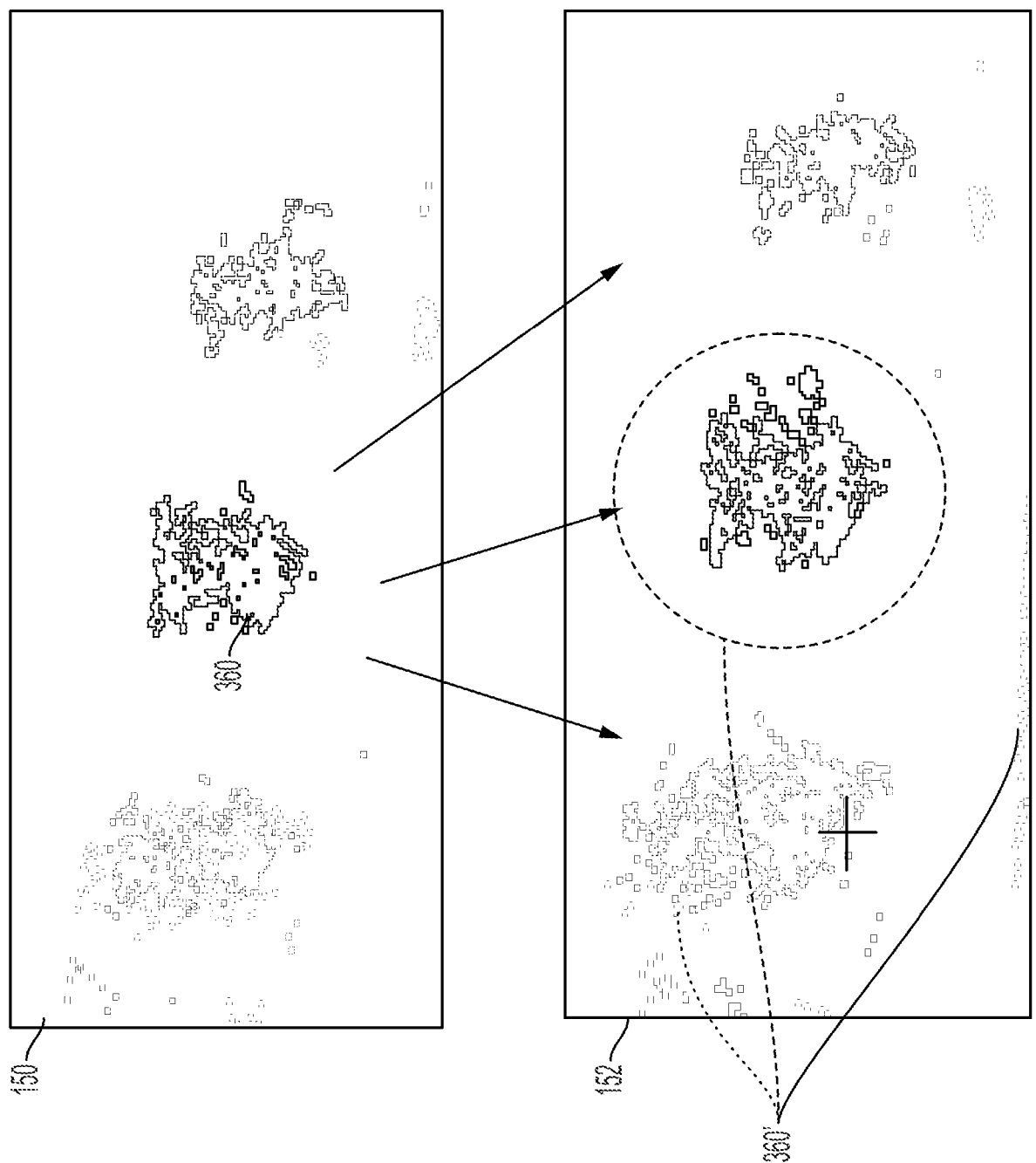
FIG. 4 depicts prediction and matching of features corresponding to a future frame according to one or more aspects.

FIG. 4 depicts prediction and matching of features corresponding to a future frame 152 according to one or more aspects. The predicted features are then computed for the future frame 152 based on the features from the present frame 150 and the vehicle motion B, and sensor motion A. The ground feature transform is computed as:

$$f_g' = Tr(f_g, A)$$

Here, $f_g'$ is the predicted feature based on the feature vector $f_g$ from the present frame, and the sensor motion A, Tr being the predictive transformation. The transformation can be expressed in an expanded form as:

$$\begin{bmatrix} c_g' \\ 1 \end{bmatrix} = A \begin{bmatrix} c_g \\ 1 \end{bmatrix}, n_g' = A_{1:3, 1:3} n_g, f_g' = \begin{bmatrix} c_g' \\ n_g' \end{bmatrix}$$

In the same manner, for each cluster 360 in the present frame, a corresponding predicted cluster 360' is computed as:

$$f_n' = Tr(f_n, A)$$

-continued $$\begin{bmatrix} c'_n \\ 1 \end{bmatrix} = A \begin{bmatrix} c_n \\ 1 \end{bmatrix}, [v'_1, v'_3] = A_{1:3,1:3}[v_1, v_3]$$

$$f'^T_n = \begin{bmatrix} c'^T_n, \frac{s_1}{\sqrt{m}}, \frac{s_2}{\sqrt{m}}, \frac{s_3}{\sqrt{m}}, v'^T_1, v'^T_3, m \end{bmatrix}$$

As used herein, a symbol with an apostrophe (') indicates a predicted version of information corresponding to the future frame 152, the symbol (without the apostrophe) representing corresponding information in the present frame 150 (and in the future frame 152 itself).

Further, a feature matching is performed between two corresponding clusters from the present frame (frame k−1) and the future frame (frame k). A distance between two clusters in the high dimensional feature space indicates a difference between the two clusters. If the distance is below a predetermined threshold value, the two clusters are deemed to be matching. The distance between a cluster $C_i$ and a cluster $C_j$, is computed using the respective feature vectors as:

$$d_{i,j}^2 = \text{Dist}_w(f_i, f_j) = (f_i - f_j)^T W (f_i - f_j)$$

Here, W is a diagonal matrix of weights, which are predetermined values.

For each cluster $C_i$ in frame k−1 150 and each cluster $C_j$ in frame k 152, feature matching is performed to determine the matched cluster pairs (such as using K-d tree, brute force feature matching, or any other algorithm).

In one or more aspects, the feature matching includes performing the feature prediction for features from frame k−1 150. Further, candidate index set {i} is obtained from frame k−1 150, and candidate index set {j} from frame k 152. {i} and {j} represent the indices of all clusters that we try to match in frame k−1 150 and frame k 152, respectively. Using the index sets, matched pair<i*, j*> is identified such that:

$$d_{i^*,j^*}^2 \leq d_{i,j}^2 \forall i \in \{i\} \text{ and } j \in \{j\}$$

Once identified as matching index sets, i* from {i} and j* from {j} are removed for further iterations, and if {i} and {j} are not empty, the above operations are repeated to identify another matching pair. Otherwise, if {i} and {j} are empty, the feature matching is deemed to be completed.

At block 250, feature registration is performed between the present frame (k−1) 150 and the future frame (k) 152. For the registration, the distance of matched cluster features is computed as:

$$d_{i^*,j^*}^2 = \text{Dist}_w(Tr(f_{i^*},A),f_{j^*}) = (Tr(f_{i^*},A) - f_{j^*})^T W (Tr(f_{i^*},A) - f_{j^*})$$

And the distance of ground features between two the frames is computed as:

$$d_k^2 = \text{Dist}_g(f_{g,k-1}, f_{g,k}) = |c_{g,k}^T n_{g,k-1} - c_{g,k}^T n_{g,k}|^2,$$

Or $|c_{g,k-1}^T n_{g,k-1} - c_{g,k}^T n_{g,k}|^2 + \lambda |n_{g,k-1} - n_{g,k}|^2,$ Or $|c_{g,k-1}^T n_{g,k-1} - c_{g,k}^T n_{g,k}|^2 + \lambda \arccos |n_{g,k-1} n_{g,k}|.$ Here, λ represents a coefficient of weight of the normal vector difference in the ground feature distance.

Using the registration above, the optimum motion A is determined.

In one or more aspects, the optimum motion A is determined by computing a one-time optimization:

$$A^* = \underset{A}{\operatorname{argmin}} \left\{ w_g \text{Dist}_g(Tr(f_{g,k-1}, A), f_{g,k}) + \sum_{(i^*,j^*)} w_{i^*,j^*} \text{Dist}_w(Tr(f_{i^*}, A), f_{j^*}) \right\}.$$

Here, $w_g$ and $w_{i^*,j^*}$ are weights assigned to each pair of index sets. In some aspects, the weights are dynamically adjusted, e.g., based on the number of points in the index sets. Weights can be predetermined in other aspects.

In one or more aspects, the optimum motion A is determined by using a consensus method. In this technique, for each feature pair, A is computed as:

$$A_g = \underset{A}{\operatorname{argmin}} \text{Dist}_g(Tr(f_{g,k-1}, A), f_{g,k})$$

$$A_{i^*,j^*} = \underset{A}{\operatorname{argmin}} \text{Dist}_w(Tr(f_{i^*}, A), f_{j^*})$$

$A_g$ is the motion for the ground points and $A_{i,j}$ is the motion for object points. Further, the optimum motion A is determined using consensus of the several determined motions $\{A_g, A_{i^*,j^*}\}$. Here, consensus selects one of the several motions computed as the optimum motion, or determines inliers among several motions and computes an optimum motion based on the inliers. The selection can be based on a predetermined criterion, such as maximum value, minimum value, median value, average value, etc.

In yet other aspects, the optimum motion A is determined by using another consensus method. In this technique, the motion A for each feature pair using analytical solution:

$$A_{i^*,j^*} = \begin{bmatrix} I & c_{j^*} - c_{i^*} \\ 0 & 1 \end{bmatrix}$$

The optimum A is then determined from the consensus of $\{A_{i^*,j^*}\}$.

At block 255, enabling conditions to execute the alignment algorithm are checked. In some aspects, the enabling conditions can include checking if |steering_wheel_angle|<θ$_2$ AND |acceleration|<θ$_3$ AND speed>θ$_4$, where the θ$_2$, θ$_3$ and θ$_4$ are predetermined threshold values. If the enabling conditions are satisfied, and then the alignment process is performed, at block 260. In some aspects, checking enabling conditions can be executed at any of the steps of 210, 220, 230, 240, 250, 260 and 270.

If the enabling conditions are satisfied, using the feature vectors and other calculations described above, an alignment of the respective coordinate systems of the sensor 110 and the vehicle 100 is performed, at block 270. The alignment parameters that are computed and output can include a motion vector, a rotation, a yaw, a roll a pitch, a height, etc. These alignment parameters are applied to the sensor 110 in one or more aspects to align the sensor 110 to the vehicle 100 (or vice versa). The alignment parameters are calculated as follows:

Motion vector $t = -A_{1:3,4}$;

$t' = \text{roty}(\text{pitch})\text{rotx}(\text{roll})t$; and $\text{yaw} = -\arctan(t_2'/t_1')$ The alignment results can be expressed by characterizing the transformation (rotation+translation), for example, using either 6 parameters (x, y, z (height), roll, pitch, yaw), or a coordinate transformation matrix CTM, or quaternion.

In some aspects, the results from different frames are aggregated to compute a final alignment result that is robust. At block 275, a post-processing operation is performed for the final alignment aggregation is performed. In some aspects, the aggregation is performed only on select frames. For example, results computed from frames in which |steering_wheel_angle|<θ5 AND number_of_matched_clusters>θ$_6$ are used for the alignment aggregation. In some aspects, the aggregation is performed only on one of the alignment parameters, for example yaw, to determine the number of frames to be used for the aggregation. For example, once the number of results in {yaw} reaches a predetermined threshold θ$_7$, the consensus result such as median of {yaw} is output as the final result along with the final results of the other alignment parameters. The other alignment parameters are also finalized in the same manner, for example, by computing the median of the values over the selected frames. Alternatively, in other examples, the consensus is determined by using other computation, such as mean, mode, geometric mean, or any other statistical computation.

The described alignment computation facilitates determining the alignment parameters to be applied to the measurements from the sensor 110 to align the measurements with the coordinate system 120 of the vehicle 100. In yet other aspects, the sensor 110 is aligned with a second sensor (not shown) of the vehicle 100 using the above alignment calculations. For example, alignment parameters are calculated for both, the sensor 110 and the second sensor with reference to the coordinate system 120 of the vehicle 100. The two sets of alignment parameters are combined to determine the alignment parameters of the sensor 110 with respect to the second sensor (and vice versa).

Presently, such alignment is performed in an off-line manner, by taking the vehicle 100 to a designated station (e.g., manufacturing facility, service station, vehicle dealer, workshop, etc.), using specialized hardware and calibration targets/sheets. It should be noted that steps performed for such an off-line alignment may vary from the operations described herein for a dynamic alignment. Further, for such a designated alignment and/or calibration station, stringent requirements are to be met (e.g., leveling the floor, horizontal of the sensor 110, and the vehicle 100, placement of the target from the vehicle, lighting conditions, etc.). Such calibration process is both cumbersome and costly. In addition to requiring the special facilities, and sometimes for cost prohibitive reasons, such alignment may be provided only at a select few locations. Hence, user (e.g., owner, consumer, etc.) of the vehicle 100 may be forced to undertake lengthy and costly trips to have such a sensor alignment performed in case of repair/replacement, etc.

Technical solutions described herein address such challenges and provide an improvement to the alignment process for sensors and vehicles. Accordingly, technical solutions described herein provide a practical application to improve the alignment of sensors and vehicles and in turn, use of sensors by the vehicle to perform one or more functions based on analysis of the sensor information. Further yet, as will be evident from the description herein, technical solutions described herein provide improvements to computing technology, particularly techniques used for alignment of sensors with vehicles. In one or more aspects, the techniques described herein are performed using an on-board computing device of a vehicle, where such on-board computing device has limited computing resources (e.g., memory, processing power, etc.).

The controller 130 uses the techniques described herein to perform the sensor calibration, which includes the alignment of the sensor 110 to the vehicle 100 (e.g., computing CTM between the coordinate system 122 and the coordinate system 120). Further, the alignment can include aligning one sensor 110 to another sensor 110 (e.g., camera to LIDAR, first camera to second camera, etc.). In one or more aspects, alignment between a first sensor and a second sensor can be performed by independently aligning the first and the second sensor to the vehicle coordinate system 120, and then computing an alignment between the two sensors based on their independent mapping. Alternatively, or in addition, the two sensors can be aligned with each other directly using the technical solutions described herein. It should be noted that the examples herein use the vehicle's coordinate system 120 as one of the coordinate systems for alignment; however, in other aspects, the technical solutions herein can be performed using any other coordinate system, such as that of another sensor.

The terms "a" and "an" do not denote a limitation of quantity, but rather denote the presence of at least one of the referenced item. The term "or" means "and/or" unless clearly indicated otherwise by context. Reference throughout the specification to "an aspect," means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A computer-implemented method for aligning a sensor to a vehicle, the computer-implemented method comprising:
receiving a first frame of measurement from the sensor associated with a vehicle, the first frame comprising a first point cloud representing one or more objects or the ground;

segmenting, from the first frame, one or more clusters $C_i$ representing the one or more objects or the ground, respectively;

computing a first set of feature vectors $f_i$, for each of the one or more clusters $C_i$, respectively;

predicting, based on the first set of feature vectors $f_i$, a second set of feature vectors $f_i'$ respectively based on an initial transformation;

computing a third set of feature vectors $f_j$ for a second frame comprising a second point cloud comprising one or more clusters $C_j$ representing the one or more objects or the ground;

identifying a pair of matching clusters from the clusters $C_i$ and $C_j$ from the first frame and the second frame, respectively;

computing a feature distance between the pair of matching clusters;

computing an alignment transformation by updating the initial transformation based on the feature distance; and aligning the sensor and the vehicle based on the alignment transformation.

2. The computer-implemented method of claim 1, wherein predicting the second set of feature vectors comprises:

computing a vehicle motion vector B based on a velocity of the vehicle; and computing a sensor motion vector A based on the vehicle motion vector B.

3. The computer-implemented method of claim 2, wherein predicting the second set of feature vectors further comprises, predicting a feature vector $f_i'$ of a cluster $C_i'$ based on the sensor motion vector A and a feature vector $f_i$ of the cluster $C_i$.

4. The computer-implemented method of claim 2, wherein the sensor motion vector A is computed as:

$$A = X_{init} B X_{init}^T, X_{init} \text{ being the initial transformation.}$$

5. The computer-implemented method of claim 1, wherein a feature vector $f_n$ of a cluster $C_n$ includes at least one of a cluster center positions, a cluster orientation, a cluster size, a cluster shape, and a number of points in the cluster.

6. The computer-implemented method of claim 1, wherein the sensor is one of a camera, a LIDAR, and a RADAR.

7. The computer-implemented method of claim 1, wherein the alignment transformation comprises one of a transformation matrix, a quaternion, and a set of parameters comprising roll, pitch, yaw, x-translation, y-translation, and z-translation.

8. The computer-implemented method of claim 1, wherein the sensor is mounted on the vehicle, and the alignment transformation aligns a first coordinate system of the sensor to a second reference coordinate system of the vehicle.

9. The computer-implemented method of claim 1, wherein the sensor is mounted on the vehicle, and the alignment transformation aligns a first coordinate system of the sensor to a second reference coordinate system of another sensor of the vehicle.

10. A system for dynamically aligning a sensor to a vehicle, the system comprising:

a processor comprising a plurality of processing cores; and a memory device coupled with the processor, wherein the processor is configured to align the sensor and a reference coordinate system of the vehicle by performing a method comprising:

receiving a first frame of measurement from the sensor associated with the vehicle, the first frame comprising a first point cloud representing one or more objects or the ground;

segmenting, from the first frame, one or more clusters $C_i$ representing the one or more objects or the ground, respectively;

computing a first set of feature vectors $f_i$, for each of the one or more clusters $C_i$, respectively;

predicting, based on the first set of feature vectors $f_i$, a second set of feature vectors $f_i'$ respectively based on an initial transformation;

computing a third set of feature vectors $f_j$ for a second frame comprising a second point cloud comprising one or more clusters $C_j$ representing the one or more objects or the ground;

identifying a pair of matching clusters from the clusters $C_i$ and $C_j$ from the first frame and the second frame, respectively;

computing a feature distance between the matching clusters;

computing an alignment transformation by updating the initial transformation based on the feature distance; and aligning the sensor and the vehicle based on the alignment transformation.

11. The system of claim 10, wherein predicting the second set of feature vectors comprises:

computing a vehicle motion vector B based on a velocity of the vehicle; and computing a sensor motion vector A based on the vehicle motion vector B.

12. The system of claim 11, wherein predicting the second set of feature vectors further comprises, predicting a feature vector $f_i'$ of a cluster $C_i'$ based on the sensor motion vector A and a feature vector $f_i$ of the cluster $C_i$.

13. The system of claim 11, wherein the sensor motion vector A is computed as:

$$A = X_{init} B X_{init}^T, X_{init} \text{ being the initial transformation.}$$

14. The system of claim 10, wherein a feature vector $f_n$ of a cluster $C_n$ includes at least one of a cluster center position, a cluster orientation, a cluster size, a cluster shape, and a number of points of the cluster.

15. The system of claim 10, wherein the sensor is one of a camera, a LIDAR, and a RADAR.

16. The system of claim 10, wherein the sensor is mounted on the vehicle, and the alignment transformation aligns a first coordinate system of the sensor to a second reference coordinate system of the vehicle or of another sensor of the vehicle.

17. A vehicle comprising:

a sensor;

a processor comprising a plurality of processing cores;

a memory device coupled with the processor, wherein the processor is configured to align the sensor to the vehicle by performing a method comprising:

receiving a first frame of measurement from the sensor associated with a vehicle, the first frame comprising a first point cloud representing one or more objects or the ground;

segmenting, from the first frame, one or more clusters $C_i$ representing the one or more objects or the ground, respectively;

computing a first set of feature vectors $f_i$ for each of the one or more clusters $C_i$, respectively;

predicting, based on the first set of feature vectors $f_i$ a second set of feature vectors $f_i'$ respectively based on an initial transformation;

computing a third set of feature vectors $f_j$ for a second frame comprising a second point cloud comprising one or more clusters $C_j$ representing the one or more objects or the ground;

identifying a pair of matching clusters from the clusters $C_i$ and $C_j$ from the first frame and the second frame, respectively;

computing a feature distance between the matching clusters;

computing an alignment transformation by updating the initial transformation based on the feature distance; and aligning the sensor and the vehicle based on the alignment transformation.

18. The vehicle of claim 17, wherein predicting the second set of feature vectors comprises:

computing a vehicle motion vector B based on a velocity of the vehicle; and computing a sensor motion vector A based on the vehicle motion vector B, wherein the sensor motion vector A is computed as:

$A = X_{init} B X_{init}^T$, $X_{init}$ being the initial transformation.

19. The vehicle of claim 18, wherein predicting the second set of feature vectors further comprises, predicting a feature vector $f_i'$ of a cluster $C_i'$ based on the sensor motion vector A and a feature vector $f_i$ of the cluster $C_i$.

20. The vehicle of claim 17, wherein a feature vector $f_n$ of a cluster $C_n$ includes at least one of a cluster center position, a cluster orientation, a cluster size, a cluster shape, and a number of points in the cluster.

* * * * *